US008374978B2

(12) United States Patent  (10) Patent No.: US 8,374,978 B2
Shacham et al.  (45) Date of Patent: Feb. 12, 2013

(54) CONTEXT-SENSITIVE DYNAMIC BLOAT DETECTION SYSTEM THAT USES A SEMANTIC PROFILER TO COLLECT USAGE STATISTICS

(75) Inventors: Ohad Shacham, Kfar Monash (IL); Martin Vechev, Yorktown Heights, NY (US); Eran Yahav, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 439 days.

(21) Appl. No.: 12/789,668

(22) Filed: May 28, 2010

(65) Prior Publication Data

US 2011/0295789 A1 Dec. 1, 2011

(51) Int. Cl.
*G06F 15/18* (2006.01)
(52) U.S. Cl. .......................................................... 706/12
(58) Field of Classification Search .................... 706/12, 706/45, 62
See application file for complete search history.

(56) References Cited

U.S. PATENT DOCUMENTS 8,156,481 B1 * 4/2012 Koh et al. ...................... 717/151
2007/0073745 A1 * 3/2007 Scott et al. ..................... 707/100

OTHER PUBLICATIONS

Shacham et al., "Chameleon: Adaptive Selection of Collections", ACM SIGPLAN Notices, PLDI '09, vol. 44, pp. 408-418 (Jun. 2009).

* cited by examiner

*Primary Examiner* — David Vincent
(74) *Attorney, Agent, or Firm* — Ryan, Mason & Lewis, LLP

(57) ABSTRACT

Methods and apparatus are provided for a context-sensitive dynamic bloat detection system. A profiling tool is disclosed that selects an appropriate collection implementation for a given application. The disclosed profiling tool uses semantic profiling together with a set of collection selection rules to make an informed choice. A collection implementation, such as an abstract data entity, is selected for a given program by obtaining collection usage statistics from the program. The collection implementation is selected based on the collection usage statistics using a set of collection selection rules. The collection implementation is one of a plurality of interchangeable collection implementations having a substantially similar logical behavior for substantially all collection types. The collection usage statistics indicate how the collection implementation is used in the given program. One or more suggestions can be generated for improving the collection allocated at a particular allocation context.

25 Claims, 9 Drawing Sheets

*FIG. 3*

| NAME | DESCRIPTION |
|---|---|
| OVERALL LIVE DATA | TOTAL/MAX SIZE OF ALL REACHABLE OBJECTS |
| COLLECTION LIVE DATA | TOTAL/MAX SIZE OF COLLECTION OBJECTS |
| COLLECTION USED DATA | TOTAL/MAX USED PART OF COLLECTION OBJECTS |
| COLLECTION CORE DATA | TOTAL/MAX CORE PART OF COLLECTION OBJECTS |
| COLLECTION OBJECT NUMBER | TOTAL/MAX NUMBER OF LIVE COLLECTION OBJECTS |
| NUMBER OF OPERATIONS | TOTAL NUMBER OF OPERATIONS PERFORMED |
| AVG/VAR OPERATION COUNT | AVERAGE NUMBER OF TIMES AN OPERATION WAS PERFORMED. AND ITS STANDARD DEVIATION. |
| AVG/VAR MAXIMAL SIZE | AVERAGE MAXIMAL SIZE OF COLLECTIONS ALLOCATED. AND ITS STANDARD DEVIATION. |

| rule | := | srcType cond implType \| |
| | | srcType cond implType(capacity) |
| srcType | := | Collection \| ArrayList \| LinkedList \| ... |
| implType | := | ArrayList \| ArrayMap \| HashSet \| ... |
| cond | := | comparison \| cond $\wedge$ cond \| ... |
| comparison | := | expr $\leq$ constant \| expr == constant \| ... |
| expr | := | opCount \| opVar \| data \| expr + expr \| ... |
| opCount | := | #add \| #get(int) \| #get(Object) \| ... |
| opVar | := | @add \| @remove \| ... |
| data | := | tracedata \| heapdata |
| tracedata | := | size \| maxSize \| initialCapacity |
| heapdata | := | maxLive \| totLive \| maxUsed \| totUsed ... |
| capacity | := | INT \| maxSize |

| TYPE | CONDITION | CATEGORY: MESSAGE | SUGGESTED FIX |
|---|---|---|---|
| ArrayList | #contains > N < maxSize > Y | Time: Inefficient use of an ArrayList: large volume of contains operations on a large sized list | LinkedHashSet |
| LinkedList | #get(int) > N | Time: Inefficient use of an LinkList: large volume of random accesses using get(i) | ArrayList |
| LinkedList | (#add(int.Object) + #addAll(int.Collection) - #remove(int) + #removeFirst) < N | Space: LinkedList overhead not justified when adding/removing elements from the middle/head of the list is hardly performed | ArrayList |
| Collection | maxSize == 0 | Space: Redundant collection allocation | LazyArrayList |
| HashSet | maxSize < N | Space: ArraySet more efficient than an HashSet. Time: operations on a small array might be faster than on an HashSet | ArrayList |
| Collection | #allOps = 0 | Space/Time: Redundant collection | avoid allocation |
| Collection | #allOps == #copied | Space/Time: Redundant copying of collections | eliminate temporaries |
| Collection | maxSize > initialCapacity | Space/Time: incremental resizing | set initial capacity |
| Iterator | collection.size == 0 | Space: Redundant iterator | remove |

FIG. 7

| NAME | DESCRIPTION |
|---|---|
| LIVE DATA | THE SIZE OF ALL REACHABLE OBJECTS |
| COLLECTION LIVE DATA | TOTAL OCCUPIED SIZE OF COLLECTION OBJECTS |
| COLLECTION USED DATA | TOTAL USED SIZE OF COLLECTION OBJECTS |
| COLLECTION CORE DATA | TOTAL CORE SIZE OF COLLECTION OBJECTS |
| COLLECTION OBJECT NUMBER | TOTAL NUMBER OF LIVE COLLECTION OBJECTS |
| TYPE DISTRIBUTION | LIVE SIZE BREAKDOWN FOR EACH TYPE |

CONTEXT-SENSITIVE DYNAMIC BLOAT DETECTION SYSTEM THAT USES A SEMANTIC PROFILER TO COLLECT USAGE STATISTICS

FIELD OF THE INVENTION

The present invention relates generally to bloat detection systems and, more particularly, to methods and apparatus for selecting an appropriate collection implementation for a given application.

BACKGROUND OF THE INVENTION

Many programming languages, such as Java, C#, Python and Ruby, include a collection framework as part of the language runtime. Generally, collection frameworks provide the programmer with abstract data types for handling groups of data (e.g, lists, sets and maps), and hide the details of the underlying data structure implementation. Modern programs written in these languages rely heavily on collections, and choosing the appropriate collection implementation (and parameters) for every usage point in a program may be critical to program performance.

Real world applications may be allocating collections in thousands of program locations, making any attempt to manually select and tune collection implementations into a time consuming and often infeasible task. Recent studies have shown that in some production systems, the utilization of collections might be as low as 10%. In other words, 90% of the space consumed by collections in the program is overhead.

Existing profilers ignore collection semantics and memory layout, and aggregate information based on types. Offline approaches using heap-snapshots (such as those described in N. Mitchell and G. Sevitsky, "Leakbot: An Automated and Lightweight Tool for Diagnosing Memory Leaks in Large Java Applications," ECOOP 2003—Object-Oriented Programming, 17th European Conference, vol. 2743 of Lecture Notes in Computer Science, 351-377 (2003); or N. Mitchell and G. Sevitsky, "The Causes of Bloat, the Limits of Health," OOPSLA '07: Proc. of the 22nd annual ACM SIGPLAN Conf. on Object Oriented Programming Systems and Applications, ACM, 245-260 (2007)) lack information about access patterns, and cannot correlate heap information back to the relevant program site.

Further, existing profiling tools require the user to manually filter large amounts of irrelevant data, typically offline, in order to make an educated guess. Using several heap-snapshots taken during program execution may reveal the types that are responsible for most of the space consumption. However, a heap snapshot does not correlate the heap objects to the point in the program in which they are allocated. Therefore, finding the program points that need to be modified requires significant effort, even for programmers familiar with the code. Moreover, once the point of collection allocation is found, it is not clear how to choose an alternative collection implementation.

In particular, choosing an alternative collection implementation with lower space overhead is not always desirable. Some structures, such as hash-tables, have inherent space overhead to facilitate more time-efficient operations. In order to pick an appropriate implementation, some information about the usage pattern of the collection in the particular application is required.

A need therefore exists for improved profiling tools that automatically select the appropriate collection implementations for a given application. A further need exists for improved profiling tools that use semantic profiling together with a set of collection selection rules to make an informed choice. Yet another need exists for a profiling tool that integrates heap-information with information about the usage-pattern of collections.

SUMMARY OF THE INVENTION

Generally, methods and apparatus are provided for a context-sensitive dynamic bloat detection system. According to one aspect of the invention, a profiling tool is disclosed that selects an appropriate collection implementation for a given application. According to another aspect of the invention, the disclosed profiling tool uses semantic profiling together with a set of collection selection rules to make an informed choice.

A collection implementation, such as an abstract data entity, is selected for a given program by obtaining collection usage statistics from the program. The collection implementation is selected based on the collection usage statistics using a set of collection selection rules. The collection implementation is one of a plurality of interchangeable collection implementations having a substantially similar logical behavior for substantially all collection types. The collection usage statistics optionally comprise one or more of information about a heap and information about one or more usage patterns.

The collection usage statistics indicate how the collection implementation is used in the given program. In one exemplary embodiment, the collection usage statistics are context-specific. The collection usage statistics comprise, for example, one or more of continuous space utilization and access patterns for each object. The collection usage statistics are optionally collected in real-time. The collection usage statistics can be mapped back to a particular allocation context in the program.

According to another aspect of the invention, one or more suggestions can be generated for improving the collection allocated at a particular allocation context. A ranked list of allocation contexts can optionally be provided based on a potential space saving. The collection selection rules can be obtained from a user written in an implementation selection language. The collection selection rules can balance minimizing a time required to perform operations and minimizing a space required to represent application data.

A more complete understanding of the present invention, as well as further features and advantages of the present invention, will be obtained by reference to the following detailed description and drawings.

BRIEF DESCRIPTION OF THE DRAWINGS

FIG. 3 is a sample table indicating tracked data for an exemplary implementation of the present invention;

FIG. 4 illustrates an exemplary language for implementing selection rules;

FIG. 5 illustrates an exemplary set of selection rules that are built into the exemplary profiling tool;

FIG. 7 illustrates an exemplary set of metrics computed by the collector;

DETAILED DESCRIPTION OF PREFERRED EMBODIMENTS

The present invention provides an automatic tool with low overhead that assists the programmer in choosing the appropriate collection implementation for a given application. As discussed further below, during program execution, the disclosed tool computes trace and heap-based metrics on collection behavior. According to one aspect of the present invention, these computed metrics are processed on-the-fly by a rules engine that outputs a list of suggested collection adaptation strategies. The tool can apply these corrective strategies automatically or present them to a programmer for review.

Figure 1:
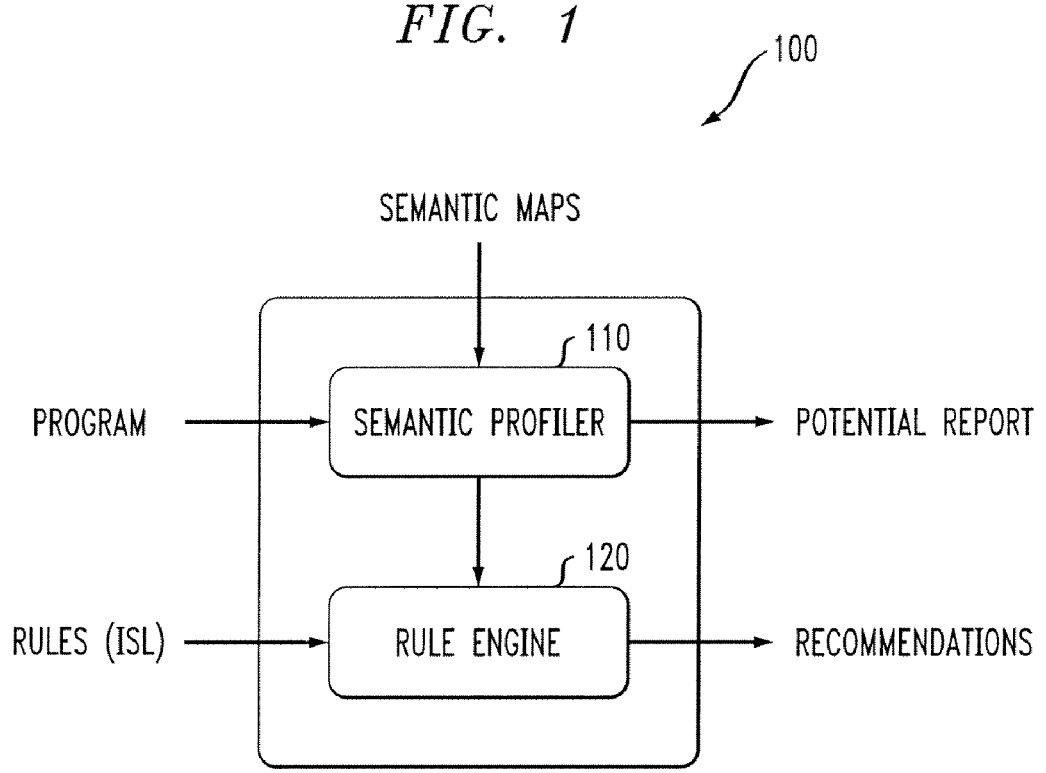
FIG. 1 illustrates an exemplary implementation of a profiling tool incorporating features of the present invention.

FIG. 1 illustrates an exemplary implementation of a profiling tool 100 incorporating features of the present invention. As shown in FIG. 1 and discussed hereinafter, the exemplary profiling tool 100 comprises a semantic profiler 110 and a rule engine 120. The profiling tool 100 can be implemented, for example, using a J9 production Java Virtual Machine (JVM), commercially available from IBM Corp. Among other benefits, the present invention leads to a significant improvement of the memory footprint of the application.

The exemplary profiling tool 100 works in two automated phases: (i) a semantic collection profiling phase; and (ii) an automatic selection phase using a rule engine. The semantic collection profiling phase gathers a wide range of collection statistics during a program run. The automatic selection phase uses a set of selection rules evaluated over the collected statistics to make implementation selection decisions. As discussed below in the section entitled "Semantic Collections Profiling," the exemplary profiling tool 100 is parametric on the semantic maps used for profiling. In addition, as discussed below in the section entitled "Rule Engine," the exemplary profiling tool 100 is parametric on the set of selection rules.

The exemplary semantic profiler 110 consists of an integrated collections-aware production virtual machine and a runtime library. During program execution, these two components collect complementary context-specific collection-usage statistics, such as continuous space utilization and access patterns for each object. The collected information can be obtained online and transparently to the programmer, without any need for an offline analysis of a general (non-targeted) heap dump. The profiling tool 100 can map the statistics back to the particular allocation context in the program, which can enable the developer to focus on collections with maximum benefit. The exemplary profiling tool 100 can optionally be pre-equipped with a set of collection selection rules that are evaluated on the dynamic statistics. The output of the profiling tool 100 is a set of suggestions on how to improve the collections allocated at a particular allocation context.

The exemplary semantic profiler 110 produces a ranked list of allocation contexts in which there is a potential for space saving. For each such allocation context, the profiler 110 provides comprehensive information such as the distribution of operations performed on collections allocated at the context and the distribution of collection sizes.

Selection from Multiple Implementations

It is assumed herein that a set of interchangeable implementations for every collection type is given. The requirement is that the different implementations have the same logical behavior. For example, a Set may be implemented using an underlying array, or a linked-list, but all implementations have to maintain the functional behavior of a set (e.g., have no duplicates). The choice of a collection implementation is substantially optimized.

According to one aspect of the invention, a semantic profiler is provided that tracks useful collection usage patterns across space and time. The disclosed profiling tool 100 aggregates and sorts data for each collection allocation-context.

According to another aspect of the invention, a collection-aware garbage collector is provided that continuously gathers statistics for a collection Abstract Data Type (ADT) rather than individual objects. Collection ADTs typically consist of several objects (that can be described by maps). The exemplary collector is parametric on the semantic ADT maps, and can be reused for any (including user-specific) collection implementation.

Another aspect of the invention provides a flexible rule engine that selects the appropriate collection implementation based on the profiling information. The exemplary rule engine allows the programmer to write implementation selection rules over the collected profile information using a simple, but expressive implementation selection language.

EXAMPLE

TVLA is a flexible static analysis framework from Tel-Aviv University. See, e.g., T. Lev-Ami and M. Sagiv, "TVLA: A framework for Kleene Based Static Analysis," Saskatchewan, Lecture Notes in Computer Science, vol. 1824, 280-301 (Springer-Verlag, 2000). The framework performs abstract interpretation with parametric abstractions, and computes a set of abstract states that over-approximate the set of all possible concrete program states. Generally, TVLA is a memory-intensive application, and its ability to tackle key verification challenges such as concurrent algorithms (which have large state spaces) is mostly limited by memory consumption. The TVLA framework makes extensive use of collections.

The present example substantially optimizes the collections usage in TVLA. The first step towards that goal is to check the potential for collection optimizations in the application.

Figure 2:
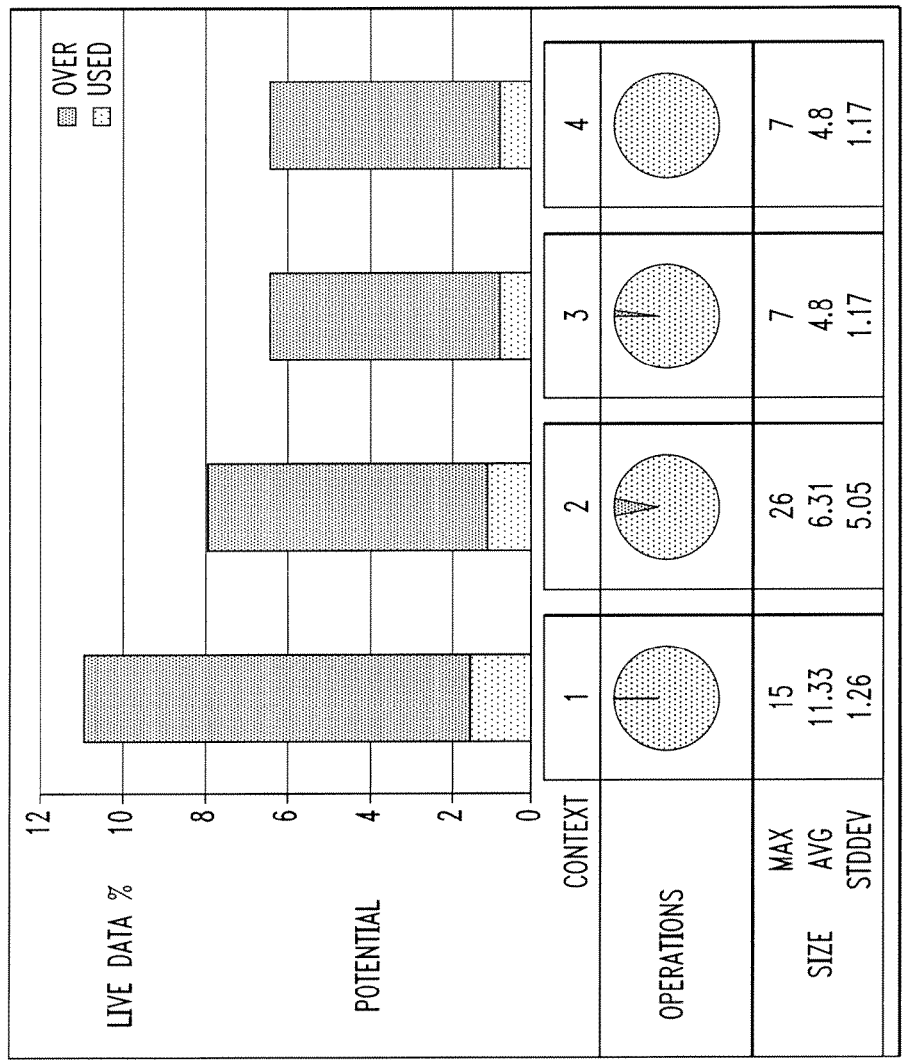
FIG. 2 illustrates an exemplary ranked list of allocation contexts in which there is a potential for space saving.

FIG. 2 illustrates an exemplary ranked list 200 of allocation contexts in which there is a potential for space saving. The exemplary list 200 shows the top four allocation contexts for the TVLA example, with their corresponding space saving potential. For example, for context 1, there is a space potential of roughly 10 percent of total live heap. Additionally, for each context, the tool 100 provides the distribution of operations (represented as circles in the figure). For brevity, the names of the operations are not shown in FIG. 2. For contexts 1, 3 and 4, the operation distribution is entirely dominated by get operations, while for context 2 there is also a small portion of add and remove operations. In addition to profiling information for each context, the exemplary profiling tool 100 produces suggestions on which collection implementations to use. For this example, the following succinct messages are provided (for ease of illustration, only suggestions for contexts 1 and 4 are shown):

1: HashMap:tvla.util.HashMapFactory:31;tvla.core.base.BaseTVS:50 replace with ArrayMap
4: ArrayList:BaseHashTVSSet:112; tvla.core.base.BaseHashTVSSet:60 set initial capacity To produce this report, the exemplary profiling tool 100 combines information on how the collections are used, with information on the potential saving in each context. The combined information is used by the rule engine 120, to yield collection tuning decisions that are presented to the user. In one exemplary implementation, the final report comprises a precisely tracked context, such as the call stack when allocation occurred (usually of depth 2 or 3). This may be required when the application uses factories for creation of collections (as may be done in TVLA).

Tradeoffs in Collection Implementations

There are tradeoffs when selecting an appropriate collection implementation.

A. Time

It is possible to base the selection on asymptotic time complexity of collection operations. However, the asymptotic time complexity of collection operations is not a good measure of their behavior when the collections contain a small number of items. In the realm of small sizes, constants matter. Furthermore, in practice, the actual performance of a collection is affected by different aspects, such as the locality of the selected structure, the cost of computing a hash function and the cost of resizing the structure.

B. Space

Collections vary in how much space overhead is consumed for storing a specific amount of data. They typically have different fixed overhead per element in the collection. For example, every element stored in the linked list implementation has an Entry object associated with it, where the entry object stores a reference to the actual element, and two references to the next and previous entries in the list.

At each allocation site in the program, the utilization of a data structure is defined as the ratio between the size of the data that it represents and the total amount of memory that this instance currently uses. Similar utilization metrics have been used in the context of memory health measures. See, for example, N. Mitchell and G. Sevitsky, "The Causes of Bloat, the Limits of Health," OOPSLA '07: Proc. of the 22nd annual ACM SIGPLAN Conf. on Object Oriented Programming Systems and Applications, ACM, 245-260 (2007). As utilization varies during the execution, both the utilization along points of program execution, and the overall average utilization of the collection are considered.

There are several causes of low utilization: (i) the initial capacity of the collection is not suited to the average size of data stored in it; (ii) the collection is not compacted when elements are removed from it; and (iii) high overhead per item in the collection.

For example, an array list expands its capacity whenever the array list runs out of available space. The capacity grows by the function newCapacity=(oldCapacity*3)/2+1. Consider an array list that has an initial capacity of 100 and contains 100 elements. Adding another element increases the size of the allocated array to 151 while only containing 101 elements.

C. Space/Time Tradeoffs

It is important to note the tradeoff between time and utilization (space). Utilization can be improved by taking more time to perform operations. For example, given an array list implementation, the array can be resized on every operation exactly to the number of elements it contains. This would incur a significant time penalty, but would keep the utilization at close to 100% (accounting for the meta-data in the collection object header etc.).

Conversely, if utilization is not an important factor, the array can be pre-allocated at the maximal number of elements, which would yield a very low utilization, but would avoid the need for resizing the array. Similarly, choosing an array over a linked-list would improve utilization, but would make update operations more costly.

Possible Solutions for Low Utilization

There are several seemingly reasonable solutions that can be used to tackle the poor utilization of data structures.

First, the initial size of all allocated collections can be set to one and then resize the collection size whenever an insertion or removal operation takes place. Second, a hybrid collection mechanism can be used. Initially, the structure is implemented as an array. Then, whenever, the size of the collection increases beyond a certain bound, the array structure can be converted to the original implementation.

The advantage of both of these solutions is that they operate based only on local knowledge. That is, decisions for the collections implementation and size are determined within the specific collection object and are not based on any kind of global information such as allocation context.

Using small initial sizes does not reduce the memory footprint due to the fact that in Hash-based ADT, such as HashMap, each hash entry is represented by a new object containing three pointer fields. The first is a next pointer referencing the next entry. The second is a prey pointer referencing the previous entry. The third is a pointer to the data itself. The entry object alone on a 32-bit architecture consumes 24 bytes (object header and three pointers). Therefore, even when starting with a small initial size, significant memory not related to actual data is consumed, in this case, due to the large entry size.

The second (hybrid) solution can be effective in reducing footprint; however, choosing the size when the conversion from an array based implementation should take place can be tricky without causing significant runtime degradation. In TVLA, for example, it has been found that making the conversion of ArrayMap to HashMap at size 16 provides a relatively low footprint with 8% performance degradation. However, increasing the conversion size to a larger number than 16 does not provide a smaller footprint and leads to performance degradation. Moreover, reducing the conversion size to 13 provides the same footprint as the original implementation does.

Automated Collection Selection

As previously indicated, aspects of the present invention automatically select the appropriate collections for a given user program.

A. Selection of Collection Implementations

Given a program that uses collections, the profiling tool 100 aims to find an assignment of collection implementations that is substantially optimal for the given program. An optimal choice of collection implementations tries to balance two dimensions: minimizing the time required to perform operations while also minimizing the space required to represent application data.

The problem of substantially optimal collection selection can be viewed as a search problem: for every point in a program allocating a collection, for each possible collection implementation, run the program, and compare the results in terms of space consumption and overall running time. However, this approach is not likely to scale for anything but the smallest programs. Furthermore, comparing results across executions can be a daunting task in the presence of nondeterminism and concurrency.

An alternative approach is to select collection implementations based on collection usage statistics extracted from the client program. Since there is no a priori bound on the number of collection objects in a program, and there is no a priori bound on the sequence of operations applied on a collection object, it is not practical to represent all operation sequences directly, and an abstraction of the usage patterns is required.

In principle, an abstraction of the collection usage pattern in a program can be obtained either statically or dynamically. However, static approaches to this problem typically abstract away the operation counts, which are an important component of usage patterns, and are not likely to scale to realistic applications. Thus, selection based on dynamic information is likely to yield a scalable approach. A dynamic approach would have to track, in a scalable manner, enough information on the usage of collections to enable the choice of appropriate implementations.

B. Semantic Collections Profiling

As previously indicated, the semantic profiler 110 collects context-specific collection-usage statistics, such as continuous space utilization and access patterns for each object.

1. Allocation Context

It is submitted that the usage patterns of collection objects allocated at the same allocation context are similar. More precisely, the allocation context of an object, o, is defined to be the allocation site in which o was allocated, and the call stack at the point when the allocation occurred.

For allocation contexts in which similarity is observed between usage patterns to hold within reasonable statistical confidence, the type of collections are determined that should be allocated in the context based on the average usage pattern.

As used herein, the term "stability" of a metric in a partial allocation context c is defined as the standard deviation of that metric in the usage profile of collections allocated in c. Examples of metrics are: the number of times a certain operation is performed on a collection instance and the maximal size of the collection during its lifetime. For every metric, a threshold can be defined that determines the limit under which the metric is considered stable.

Practically, the full allocation context is rarely needed, and maintaining it is often too expensive. Therefore, a partial allocation context can be used, containing only a call stack of depth two or three.

2. Collection Statistics

The profiling tool 100 records statistics indicating how collections in the program are used. Much of the information recorded by the tool 100 is per allocation context, and is an aggregation of the information collected for objects allocated at that context.

a. Dynamically Tracked Data

FIG. 3 is a sample table 300 indicating tracked data for an exemplary implementation of the present invention. As shown in FIG. 3, the collected information is a combination of information about the heap (e.g., the maximal heap size occupied by collection objects during execution), and information about the usage pattern (e.g., the total number of times contains was invoked on collections in the context).

b. Heap Information

The heap information provides a comprehensive summary of the space behavior of collections during program execution. This information can be collected on every garbage collection (GC) cycle. The GC computes the total and maximal live data of the program where the total live data is the sum of all live data accumulated over all of the GC cycles and the maximal live data is the largest live data seen in any GC cycle. The GC has been augmented with semantic maps and routines to compute various context-specific collection information, discussed further below. First, the GC computes the total and maximal space consumed by reachable collection objects across all GC cycles. Second, the GC computes the total and maximal space actually used by these collection objects (collection used data). This can be important for knowing how much of the collection object is really utilized. Thirdly, the GC computes the total and maximal collection core size, which would be the ideal space that would be required to store the core elements of the collection object in an array. This statistic is useful to provide a lower bound on the space requirement for the content of the collection (hence indicating the limit of any optimization). Finally, the total and maximum number of live collection objects are computed.

c. Trace Information

As previously indicated, recording the full sequence of operations applied to a collection object has a prohibitive cost. Instead, the exemplary trace information records the distribution of operations, as well as the maximal size observed for collections at the given context. The average operation counts provide a count of all possible collection operations. For some operations, those that involve interactions between collections, additional counters are introduced that count both sides of the interaction. For example, when adding the contents of one collection into another using the c1:addAll(c2) operation, the fact that addAll was invoked on c1 is recorded, as well as the fact that c2 was used as an argument for addAll. Similarly, a record is made when a collection was used in a copy constructor. These counters are particularly important for identifying temporary collection objects that are never operated upon directly, other than copying their content.

d. Using Profiling Information

The statistics from the tool can be used in several ways. For example, as the program runs, the user can request the tool to output the current top allocation contexts, sorted by maximum benefit. In the case where the user wants to make manual changes, the user can focus on the most beneficial contexts instantly. Alternatively, the user can use the recommendations automatically computed by the tool, which are based on a set of selection rules. To allow flexibility in querying the information collected by the tool, and select appropriate implementations based on it, the user can write rules in a simple language, as described hereinafter.

C. Rule Engine

As previously indicated, the rule engine 120 uses combined information to yield collection tuning decisions that are presented to the user. A user can optionally write replacement rules, using the language of FIG. 4. FIG. 4 illustrates an exemplary language 400 for implementing selection rules. In FIG. 4, rules are abbreviated that contain standard combinations of operations, such as boolean combinations for cond and arithmetic operators for expr. The exemplary language 400 allows the writing of conditional expressions under which a replacement takes place. The conditional expressions use the metrics of FIG. 3 as the basic vocabulary.

The exemplary language 400 allows the writing of conditional expressions comparing the ratios between operation counts (e.g., the ratio of contains operations #contains=#allOps) and the operation count itself (e.g., #remove==0). The exemplary language 400 also allows the user to check the variance of counts (e.g, @add). The exemplary language 400 also allows the user to query the live-data occupied by collections at the context, and the used data occupied by collections at the context. These are typically used to determine whether the potential saving in this allocation context (totLive-totUsed) is greater than some threshold.

1. Collection Selection

FIG. 5 illustrates an exemplary set 500 of selection rules that are built into the exemplary profiling tool 100. The constants used in the rules 500 are not shown, as they may be tuned per specific environment. For example, the rule:

ArrayList:#contains>X^maxSize>Y→LinkedHashSet specifies that if the type allocated at this context is an ArrayList, and the average number of contains operations performed on collections in this context is greater than some threshold X, and the average maximal size of the collection is greater than some threshold Y, then the selected type should be a LinkedHashSet.

This rule corresponds to the fact that performing a large number of contains operations on large-sized collections is better handled when the collection is a LinkedHashSet. Of course, the rule can be refined to take other operations into account. The user can write various expressions in this language that dictate which implementation to select. For example, when the potential space saving is high, one may want to apply a different collection selection even if it results in a potential slowdown. For instance, the space benefit of the rule selecting an ArraySet instead of HashSet may outweigh the time slowdown when the potential space saving (totLive-totUsed) is greater than some threshold. Conversely, any space-optimizing replacement can be avoided when the potential space savings seems negligible.

If stability is not specified explicitly in the rule, it is assumed that any metric has to have its standard deviation less than a fixed constant (in one exemplary implementation, size values are required to be tight, while operation counts are not restricted). Generally, different metrics may require different measures of variance based on their expected distribution. For example, while the operation counters usually distribute normally, maximal collection sizes are often biased around a single value (e.g., 1), with a long tail. An exemplary implementation uses standard-deviation as the stability measure, the suitability of other measures of variance can be evaluated for different metrics.

2. Towards Complete Automation

It may be beneficial to perform replacements at run-time while the program is running, for several reasons:

Lack of Stability: It is possible that collection objects from a given allocation context exhibit wide variation in behavior, for example, due to different program inputs, phasing or non-determinism. Hence, detecting these cases and allocating the appropriate collection object may be more advantageous than sticking to a single implementation for all cases.

Optimization of Underlying Framework: Most real-world software makes use of framework code. The framework code itself may make extensive use of collection. Online selection can specialize the collection-usage in underlying frameworks, that is typically outside the scope of programmer's manual modifications. In general, this follows a theme of specializing the library for a particular client, as part of the client's execution in the runtime environment.

No Programmer Effort: Manual replacement may require nontrivial code-modifications to deal with factories and deep allocation contexts. Dynamic selection is performed as part of the runtime environment and requires no manual modifications to the source code.

Dealing with completely automatic replacement is challenging because decisions may have to be based on partial information (e.g., determining at what point of the execution can it be decided to select one collection implementation over another). For example, if the tool 100 replaces the type allocated at a given context from a HashMap to an ArrayMap on the premise that objects allocated at that context have small maximal sizes, even a single collection with large size may considerably degrade program performance. Additionally, such a tool 100 must run with sufficiently low overhead to be enabled during production deployment. Therefore, it is crucial to reduce overhead costs and in particular, it is vital to be able to obtain allocation context cheaply.

Exemplary Implementation

As previously indicated, the profiling tool 100 comprises two complementary components: the library and the virtual machine, which can be integrated in a manner that is transparent to the end user. In one exemplary implementation, the components can be used separately by switching on and off each component on demand. However, for maximal benefit, they are typically used together. By selectively instrumenting the library, various useful statistics can be recorded, such as frequency of operations and distributions of operations for a given collection size. While this information is useful, it still does not provide us with a relative view of how collections behave with respect to the whole system. However, such global information can be extracted from the virtual machine and in particular from the garbage collector (GC). By instrumenting the GC to gather semantic information about collections, questions can be answered, such as the total live data occupied by collections at a specific point in time. Such information, while relatively inexpensive to obtain from the GC, is very costly to obtain at the library level.

A. Design Choices

Generally, changes to the original program should be avoided. An important place where a dilemma between portability and slightly better efficiency occurs is during allocation of a collection object. For example, if the user program requests an allocation of a HashMap object and the system determines that for this context, it is best to implement that HashMap object with an ArrayMap, there are two possible implementation choices. First, the ArrayMap can be made a subtype of HashMap and then return ArrayMap. The problem is, however, that ArrayMap would then inherit all fields from HashMap. Further, any program expressions that depend on the precise type being HashMap may work incorrectly.

Another solution is to have ArrayMap and HashMap as sibling types, but to return an object of type ArrayMap. In that case, all type declarations in the program must match ArrayMap (that were HashMap before) and that all semantic behavior depending on a specific type must be preserved. See, for example, B. D. Sutter et al., "Customization of Java Library Classes Using Type Constraints and Profile Information," Vol. 3086 of Lecture Notes in Computer Science, pp. 585-610, ECOOP 2004—Object-Oriented Programming, 18th European Conf., Oslo, Norway (Jun. 14-18, 2004). However, statically re-writing the type declarations of the program is intrusive, challenging, can lead to subtle errors due to language features such as dynamic typing, and is generally difficult to scale on large programs. One solution in that case is true to Lampson's statement that all problems in computer science can be solved by another level of indirection. Hence, another level of indirection is added between the program and the collection implementation. That is, each allocation of a collection object requires a wrapper. In the current example, whenever HashMap is allocated, it will be a small wrapper object. Then, internally, the wrapper object can point to any implementation of HashMap. It is submitted that a small delta in inefficiency is worth the software reliability gains. Further, with VM support, this inefficiency can be further reduced (e.g., via object inlining).

B. Library Architecture

Figure 6:
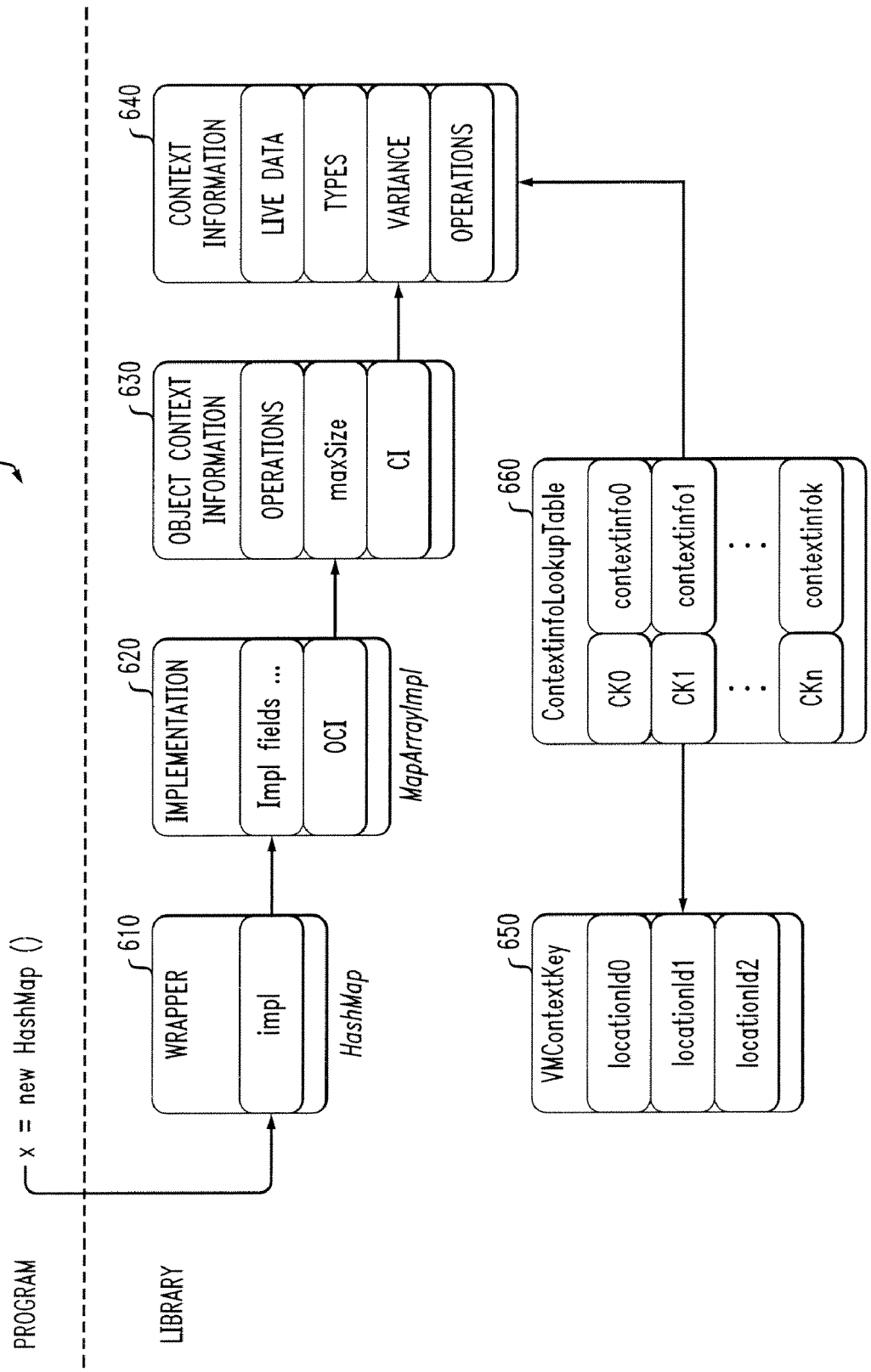
FIG. 6 illustrates an exemplary architecture of libraries that may be employed by the profiling tool.

FIG. 6 illustrates an exemplary architecture 600 of libraries that may be employed by the profiling tool 100. As shown in FIG. 6, wrappers 610 delegate collection operations to the underlying selected collection implementation 620 (similar to the Forwarding types in Google's Collections). The only information kept in the wrapper object 610 is a reference to the particular implementation. In the exemplary implementation, the actual backing implementation can be determined statically by the programmer (by explicitly providing the constructor with an appropriate constant), left as the default choice that the programmer indicated, or determined dynamically by the system 100.

As the wrapper 610 allocates the backing implementation object 620, it also obtains the call stack (context) for this allocation site and constructs a VMContextKey object 650 that records it (via the locationId fields inside the VMContextKey object 650). This object 650 is then used to look up the corresponding ContextInfo object 660, which records aggregate information for this context. In order to collect information on the collection usage pattern for this context, the backing implementation may allocate an ObjectContextInfo 630. This object 630 is used to store, for example, the various operation counters and collection maximal size.

When the collection implementation object dies, the contents of its object information object are aggregated into the corresponding ContextInfo object 640 (via finalizers as discussed below). The ContextInfo object 640 and VMContextKey object 650 are updated by the VM.

1. Obtaining Allocation Context

The exemplary profiling tool 100 tracks information at the level of an allocation context. This requires that an allocation context be obtained whenever a collection object is allocated. Consider two exemplary methods for obtaining the allocation context: (i) a language-level method based on walking the stack frames of a Throwable object; and (ii) a method using a Java Virtual Machine Tool Interface (JVMTI).

A JVMTI-based implementation has been found to be significantly faster than a Throwable-based implementation which requires the expensive allocation of a Throwable object, and the manipulation of method signatures as strings (one native implementation works directly with unique identifiers, without constructing intermediate objects to represent the sequence of methods in the context). A third implementation can employ a modification of the JVM to obtain bounded context information in a lightweight manner.

2. Sampling of Allocation Context:

To further mitigate the cost of obtaining the allocation context, the exemplary profiling tool 100 can employ sampling of the allocation contexts. Moreover, when the potential space saving for a certain type is observed to be low, the profiling tool 100 can optionally completely turn off tracking of allocation context for that type. (Technically, Sampling is Controlled at the Level of a Specific Constructor.)

3. Available Implementations

The exemplary implementation of the profiling tool 100 can use alternative implementations for collections, for example:

List:
ArrayList—resizable array implementation.
LinkedList—a doubly-linked list implementation.
LazyArrayList—allocate internal array on first update.
IntArray—array of ints. (Similar for other primitives)
Set (and similarly for Map):
HashSet (default)—backed up by a HashMap
LazySet—allocates internal array on first update
ArraySet—backed up by an array
SizeAdaptingSet—dynamically switch underlying implementation from array to HashMap based on size.

It is noted that selecting an open-addressing implementation of a HashMap (e.g., from the Trove collections) requires some guarantees on the quality of the hash function being used to avoid disastrous performance implications. This is hard to determine in Java, where the programmer can (and does) provide his or her own hashCode( ) implementation.

4. Context Information

As indicated above, the ObjectContextInfo object 630 collects the usage pattern for collection instances. This information is aggregated into the ContextInfo maintained for the corresponding allocation context.

With VM support, the context information can also contain information about the heap usage of collections allocated at the given allocation context. As indicated above, the profiling tool 100 can optionally benefit from VM support, when available, but can also be used when such VM support is absent.

C. VM Support

While gathering information at the library level is useful, it is often very difficult to obtain any kind of global view of how collections fit into the whole behavior of the program. For example, even though a particular context allocates memory at a high rate, it is still not clear whether there is much benefit globally in tracking collection usage, for it may be the case that it is a small percent of total memory. Also, it may often be useful to monitor the application with very low overhead, without tracking any library usage, in order to determine whether there is any potential whatsoever in changing the implementation of collections.

One place where much of this global information can be accessed is during the GC cycle. By examining the program heap during a GC cycle, various collection parameters can be calculated, such as distribution of live data and collection utilization. Moreover, this valuable information can be obtained with virtually no additional cost to the program execution time, and as part of normal operation of the collector. To that end, the GC can be extended to gather valuable semantic information pertaining to collections. At the end of each cycle, the collector aggregates this information in the ContextInfo object 640 (which also contains trace-based information). The library 600 can then inspect the combination of trace and heap information at the same time.

1. Context-Sensitive Collection Data

Note that simply examining the heap is often not enough, especially in large applications with thousands of program sites allocating collections. In particular, it is desirable to focus on specific allocation sites in the program which have the highest potential for gain. To that end, if the library 600 maintains context information, the collector will automatically take advantage of this and record various context-specific information into the ContextInfo object 640.

2. Collector Modifications

In one exemplary implementation, the base parallel mark and sweep garbage collector are used. First, the roots of the program are marked (such as thread stacks, finalizer buffers and static class members). Then, several parallel collector threads perform the tracing phase and compute transitive closure from these roots, marking all objects in that transitive closure. Finally, during the sweeping phase, all objects which are not marked are freed.

In the exemplary profiling tool 100, the number of parallel threads is the same as the number of cores available in hardware. It is noted that the choice of this specific collector can possibly lead to different results than if, for example, a generational collector had been used. However, the improvements in collection usage are orthogonal to the specific GC.

Various semantic metrics can be computed during a marking phase. FIG. 7 illustrates an exemplary set 700 of metrics computed by the collector. These statistics can optionally be collected on every GC cycle for each allocation context. From these metrics, aggregate per-context metrics can be computed over all GC cycles, as discussed above.

3. Semantic ADT Maps

Typically, a collection object may contain several internal objects that implement the required functionality. For example, an ArrayList object may contain an internal array of type java.lang.Object[ ] to store the required data. This means that if the tool 100 blindly iterates over the heap, object arrays that are logically part of ArrayList can not be differentiated from those object arrays that have nothing to do with collections (e.g., allocated outside of ArrayList methods). This lack of semantic correlation between objects is a common limitation of standard profilers. Therefore, to efficiently obtain accurate statistics (such as size) about collections, "semantic maps" are used. In brief, every collection type is augmented with a semantic map that describes the offsets that the collector use to find information such as the size of the object (which may involve looking up the size of the underlying array), the actual allocated size and its underlying allocation context pointer. Semantic maps are pre-computed for all collection types on VM startup. Using semantic maps allows accurate information to be obtained by avoiding expensive class and field name lookups during collection operation. Further, because the whole process is parametric on the semantic maps, the system can be run on any collection implementation (including custom implementations).

4. Operation

Every time the collector visits a non-marked object, the collector checks whether it is an object of interest (a collection object). In that case, the collector consults the semantic map of its type and quickly gathers the necessary statistics such as the live data occupied by the object (and its internal objects), the used data and the core data (the ideal space if only a pointer array was used to represent the application data). Further, if the object tracks context information, using the semantic map, the collector finds the ContextInfo object and records the necessary information for that allocation context (as discussed above in conjunction with FIG. 7).

D. Discussion

By augmenting the GC with semantic ADT maps, the profiling tool 100 can automatically and continuously compute various useful context sensitive utilization metrics specific to the semantics of collections. Moreover, because the statistics are gathered during normal collection operation, no additional performance overhead is incurred. The information obtained from the collector can be used in various ways. The information can be propagated back to the ContextInfo object in the library in order to allow the tool to make a more informed decision by combining this with the library trace-based information. In addition, the results can also be recorded for each cycle separately (it is up to the user to specify what they want to sort the results by as well as how many contexts to show) for further analysis. This information can be readily used by the programmer to quickly focus on contexts that have the most potential for further improvement.

E. Profiling Process

Figure 8:
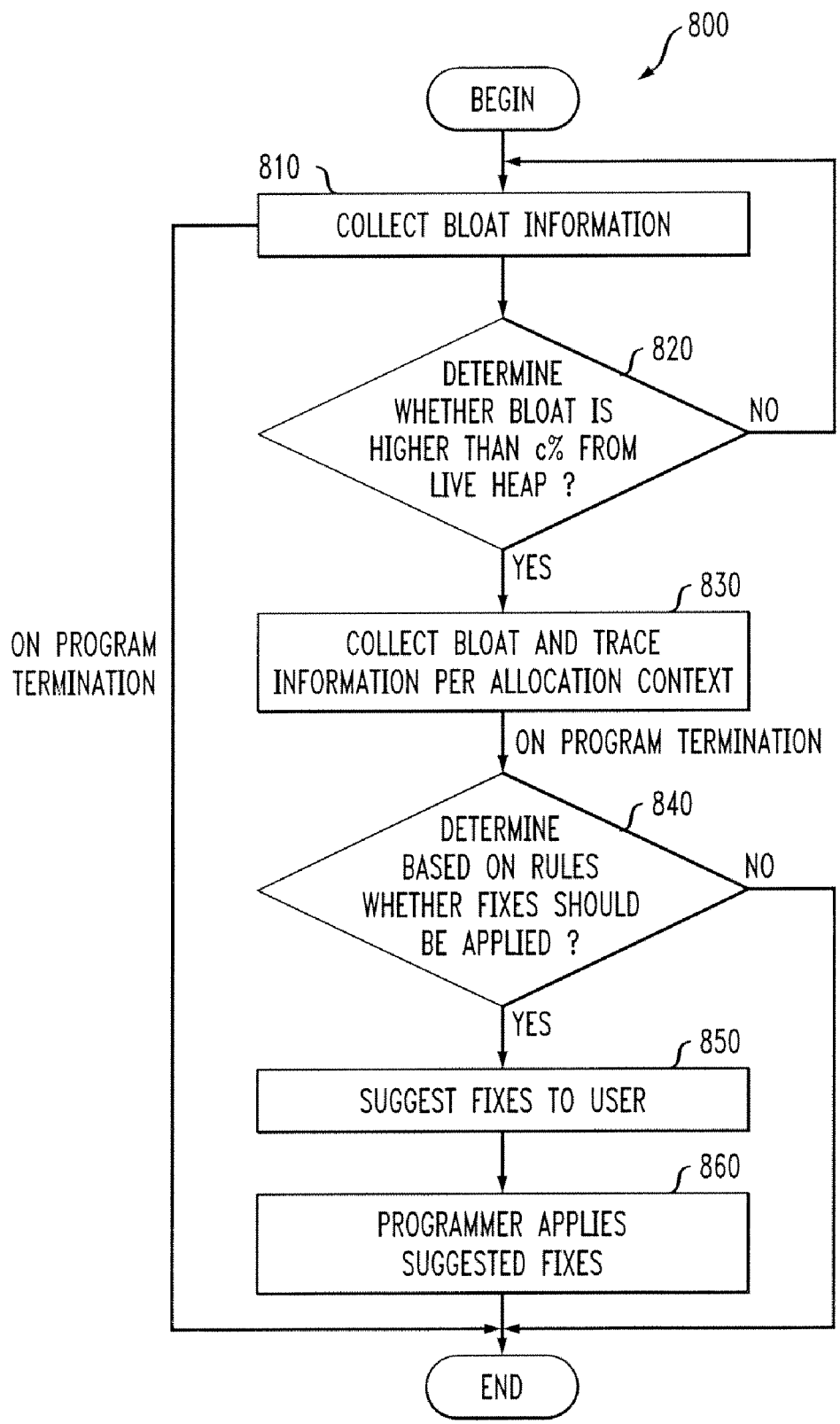
FIG. 8 is a flow chart of an exemplary profiling process incorporating features of the present invention.

FIG. 8 is a flow chart of an exemplary profiling process 800 incorporating features of the present invention. As shown in FIG. 8, the exemplary profiling process 800 initially collects bloat information during step 810. Generally, a program is bloated when execution time and memory consumption is high compared to what the program actually accomplishes. Bloat is a systemic problem, resulting from a software engineering culture encourages abstraction and layering, with a goal of rapid application development. Java programs today are assembled from many frameworks and libraries, written by different people, at different times and places. Because of the huge number of interfaces that must be digested, and the opacity of the implementations hidden in libraries, developers have little hope of understanding the performance consequences of their design choices.

The bloat information collected during step 810 is discussed further above in the section entitled "Semantic Collections Profiling."

Thereafter, during step 820, the profiling process 800 determines whether the program's bloat is higher than c % from the live heap. If the program's bloat is not higher than c %, then program control returns to step 810 and continues in the manner described above. If the program's bloat, however, is higher than c %, then program control proceeds to step 830.

The bloat and trace information is collected per allocation context during step 830. The profiling process 800 then determines during step 840, based on the exemplary rules 500, whether fixes should be applied. If it is determined that fixes should not be applied, then program terminates. If, however, it is determined that fixes should be applied, then program control proceeds to step 850.

During step 850, the exemplary profiling process 800 suggests fixes to the user. Finally, the programmer can apply the suggested fixes during step 860, before program control terminates.

For a further discussion of an exemplary implementation of the profiling tool 100, see Ohad Shacham et al., "Chameleon: Adaptive Selection of Collections," PLDI'09, Dublin, Ireland, Jun. 15-20, 2009, incorporated by reference herein.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 9:
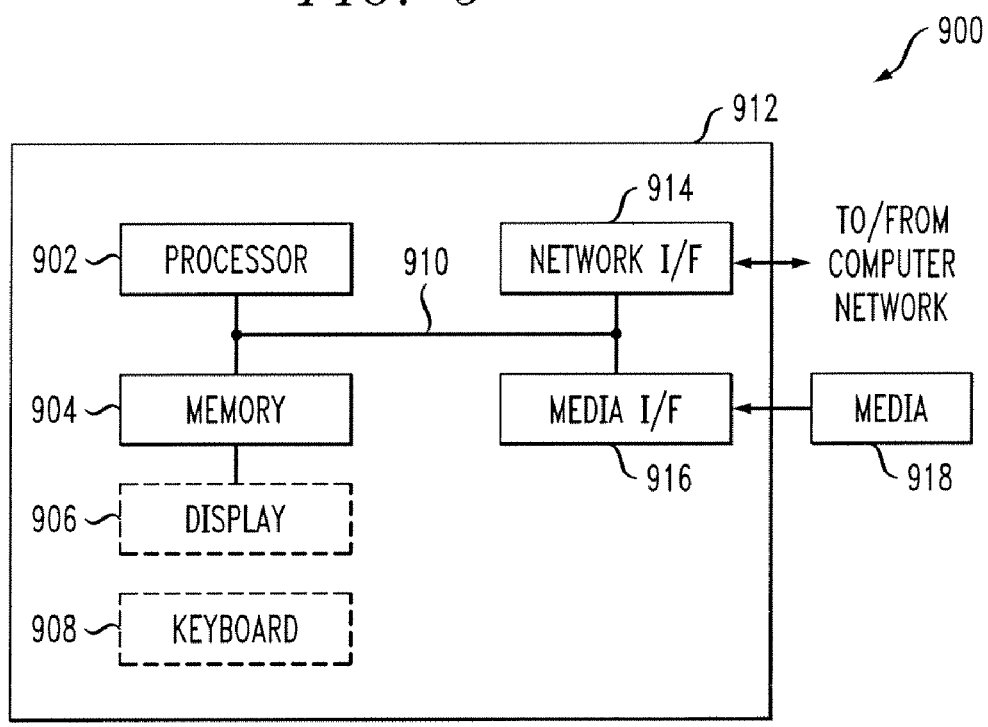
FIG. 9 depicts a computer system that may be useful in implementing one or more aspects and/or elements of the present invention.

One or more embodiments can make use of software running on a general purpose computer or workstation. FIG. 9 depicts a computer system 900 that may be useful in implementing one or more aspects and/or elements of the present invention. With reference to FIG. 9, such an implementation might employ, for example, a processor 902, a memory 904, and an input/output interface formed, for example, by a display 906 and a keyboard 908. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 902, memory 904, and input/output interface such as display 906 and keyboard 908 can be interconnected, for example, via bus 910 as part of a data processing unit 912. Suitable interconnections, for example via bus 910, can also be provided to a network interface 914, such as a network card, which can be provided to interface with a computer network, and to a media interface 916, such as a diskette or CD-ROM drive, which can be provided to interface with media 918.

Analog-to-digital converter(s) 920 may be provided to receive analog input, such as analog video feed, and to digitize same. Such converter(s) may be interconnected with system bus 910.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 902 coupled directly or indirectly to memory elements 904 through a system bus 910. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 908, displays 906, pointing devices, and the like) can be coupled to the system either directly (such as via bus 910) or through intervening I/O controllers (omitted for clarity).

Network adapters such as network interface 914 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 912 as shown in FIG. 9) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 918 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Method steps described herein may be tied, for example, to a general purpose computer programmed to carry out such steps, or to hardware for carrying out such steps, as described herein. Further, method steps described herein, including, for example, obtaining data streams and encoding the streams, may also be tied to physical sensors, such as cameras or microphones, from whence the data streams are obtained.

It should be noted that any of the methods described herein can include an additional step of providing a system comprising distinct software modules embodied on a computer readable storage medium. The method steps can then be carried out using the distinct software modules and/or sub-modules of the system, as described above, executing on one or more hardware processors 902. In some cases, specialized hardware may be employed to implement one or more of the functions described here. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for selecting at least one collection implementation for a given program, comprising:

obtaining collection usage statistics from said program by using a semantic profiler, wherein said collection usage statistics indicate how said at least one collection implementation is used in said given program; and selecting said at least one collection implementation based on said collection usage statistics using a set of collection selection rules, wherein said at least one collection implementation is one of a plurality of interchangeable collection implementations having a substantially similar logical behavior for substantially all collection types.

2. The method of claim 1, wherein said collection is an abstract data entity.

3. The method of claim 1, wherein said collection usage statistics are context-specific.

4. The method of claim 1, wherein said collection usage statistics comprise one or more of continuous space utilization and access patterns for each object.

5. The method of claim 1, wherein said collection usage statistics are collected in real-time.

6. The method of claim 1, further comprising the step of mapping said collection usage statistics back to a particular allocation context in said program.

7. The method of claim 6, wherein said allocation context of an object, o, comprises an allocation site in which o was allocated, and a call stack at a point when said allocation occurred.

8. The method of claim 7, wherein said allocation context comprises a partial allocation context having a reduced call stack depth.

9. The method of claim 1, further comprising the step of generating one or more suggestions for improving said at least one collection allocated at a particular allocation context.

10. The method of claim 1, wherein said obtaining step is performed by a garbage collector.

11. The method of claim 10, wherein said garbage collector continuously gathers statistics for a collection Abstract Data Type (ADT).

12. The method of claim 1, further comprising the step of receiving at least one collection selection rules from a user written in an implementation selection language.

13. The method of claim 1, further comprising the step of providing a ranked list of allocation contexts based on a potential space saving.

14. The method of claim 1, wherein said collection selection rules balance minimizing a time required to perform operations and minimizing a space required to represent application data.

15. The method of claim 1, wherein said collection usage statistics comprise one or more of information about a heap and information about one or more usage patterns.

16. An apparatus for selecting at least one collection implementation for a given program, comprising:

a memory; and at least one processor, coupled to the memory, operative to:

obtain collection usage statistics from said program using a semantic profiler, wherein said collection usage statistics indicate how said at least one collection implementation is used in said given program; and select said at least one collection implementation based on said collection usage statistics using a set of collection selection rules, wherein said at least one collection implementation is one of a plurality of interchangeable collection implementations having a substantially similar logical behavior for substantially all collection types.

17. The apparatus of claim 16, wherein said collection is an abstract data entity.

18. The apparatus of claim 16, wherein said collection usage statistics are context-specific.

19. The apparatus of claim 16, wherein said collection usage statistics comprise one or more of continuous space utilization and access patterns for each object.

20. The apparatus of claim 16, wherein said collection usage statistics are collected in real-time.

21. The apparatus of claim 16, wherein said processor is further configured to map said collection usage statistics back to a particular allocation context in said program.

22. The apparatus of claim 16, wherein said processor is further configured to generate one or more suggestions for improving said at least one collection allocated at a particular allocation context.

23. The apparatus of claim 16, wherein said processor is further configured to receive at least one collection selection rules from a user written in an implementation selection language.

24. The apparatus of claim 16, wherein said processor is further configured to provide a ranked list of allocation contexts based on a potential space saving.

25. An article of manufacture for selecting at least one collection implementation for a given program, comprising a tangible computer readable storage medium containing one or more programs which when executed implement the steps of:

obtaining collection usage statistics from said program by using a semantic profiler, wherein said collection usage statistics indicate how said at least one collection implementation is used in said given program; and selecting said at least one collection implementation based on said collection usage statistics using a set of collection selection rules, wherein said at least one collection implementation is one of a plurality of interchangeable collection implementations having a substantially similar logical behavior for substantially all collection types.

* * * * *